(12) United States Patent
Schabanel et al.

(10) Patent No.: US 6,238,094 B1
(45) Date of Patent: May 29, 2001

(54) WIPER SYSTEM

(75) Inventors: Francois Schabanel, Saint Maux des Fosses (FR); Thomas Kotlarski, Buehlertal; Juergen Reiss, Ingolstadt, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,054

(22) PCT Filed: Aug. 29, 1998

(86) PCT No.: PCT/DE98/02545
§ 371 Date: Aug. 9, 1999
§ 102(e) Date: Aug. 9, 1999

(87) PCT Pub. No.: WO99/12782
PCT Pub. Date: Mar. 18, 1999

(30) Foreign Application Priority Data

Sep. 11, 1997  (DE) ............................................. 197 39 842

(51) Int. Cl.[7] ............................. F16C 33/02; B60S 01/16
(52) U.S. Cl. ........................................ 384/296; 15/250.31
(58) Field of Search ..................................... 384/276, 295, 384/296; 15/250.27, 250.3, 250.31

(56) References Cited

U.S. PATENT DOCUMENTS

| | | | |
|---|---|---|---|
| 4,509,878 | * | 4/1985 | Bryson et al. ..................... 15/250.27 |
| 4,750,878 | * | 6/1988 | Nix et al. .............................. 384/296 |
| 5,507,585 | * | 4/1996 | Diederich et al. ................... 15/250.3 |
| 5,675,862 | * | 10/1997 | Reinl ................................. 15/250.31 |

FOREIGN PATENT DOCUMENTS

| | | | |
|---|---|---|---|
| 7-017365 | * | 6/1993 | (JP). |
| 9-024800 | * | 7/1997 | (JP). |

* cited by examiner

Primary Examiner—Thomas R. Hannon
(74) Attorney, Agent, or Firm—Michael J. Striker

(57) ABSTRACT

A wiper installation structure has a wiper bearing which is guided and fastened in the preassembled state to form a part through a mounting opening of a motor vehicle. The wiper bearing is held in the mounting opening via a catch connection during fastening. The catch connection has at least one hook part fastened to the wiper bearing and held in a recess of the wiper bearing by a holding ring.

7 Claims, 4 Drawing Sheets

WIPER SYSTEM

BACKGROUND OF THE INVENTION

Description of the Prior Art

The invention is based on a wiper installation according to the preamble of claim 1.

A wiper drive of a wiper installation usually drives one or more driven shafts by means of a rod linkage, wherein these driven shafts are mounted in wiper bearings and wipers are fastened to the driven shafts. The driven shafts project out of openings of a motor vehicle body and move the wipers over a windshield of the motor vehicle. In order to be able to mount the individual structural component parts or preassembled component assemblies of the wiper installation at the motor vehicle in a favorable manner, the wiper drive, rod linkage, wiper bearings and driven shafts are preferably preassembled on a plate or blank.

Subsequently, the preassembled wiper installation is correspondingly positioned and fastened at the vehicle body. In so doing, the wiper bearings are usually guided through mounting openings which can be introduced either directly in the vehicle body or in additional mounting plates. The wiper bearings are then fastened to the vehicle body or to the mounting plates.

In order to assist assembly, additional holding plates are often used. However, they are not usually sufficient for holding the wiper installation completely and securely. Therefore, during assembly the wiper installation must be held in the appropriate position with one hand, while the wiper bearings are fastened to the mounting plates with the other hand. Further, the holding plates represent additional structural component parts which are integrated in the body and must be correspondingly arranged, entailing additional effort and cost.

SUMMARY

According to the invention, the wiper bearings are held in the mounting openings by one or more catch connections before they are definitively fastened. The completely, or only partially, preassembled wiper installation with the wiper bearings is pushed through the mounting openings, the catch connection snaps in, and the wiper installation is securely fixed during the continued assembly. The person performing the assembly can then use both hands for further fastening without having to hold the wiper installation with one hand. The assembly is accordingly simpler, faster, more dependable, more pleasant for the person carrying out the assembly and therefore more economical as a whole. Additional holding plates and mounting thereof is dispensed with.

Many construction variants are known to the person skilled in the art for use as a catch connection, for example, hooks which are arranged at the mounting opening and engage behind parts of the wiper bearing or hooks which are arranged at the tubular blank and which engage around parts of the body or in openings provided for this purpose.

However, it is especially advantageous when one or more hook parts are fastened directly to the circumference of the wiper bearing in the area of the mounting opening and engage behind the rim or edge. The hook parts can be preassembled along with the structural component parts of the wiper installation. The existing edge of the mounting opening is used in addition as a snap-in edge. Since the wiper bearings are locked into the mounting holes by their catch connections, they are dependably and precisely fixed and can advantageously be completely fastened to the mounting plates.

The hook parts can be fastened to the outer circumference of the wiper bearing by frictional engagement, positive engagement or material engagement. In an advantageous construction of the invention, the hook parts are fixed to the circumference of the wiper bearing in a positive engagement so that they can be easily mounted and disassembled again.

The hook part is held in a positive engagement by a holding ring in a recess at the circumference of the wiper bearing. The wiper bearing usually has a tubular external cast part in which a bearing bush is inserted for the driven shaft. Accordingly, the recess for the hook part can easily be cast integral with the outer part or introduced in a subsequent process, for example, by cutting in a groove or notch.

The hook part can be formed of elastic material, for example, an elastic plastic or elastic metal, and can accordingly be deflected in an elastic manner during assembly. However, it may be more economical when the hook part itself has no elasticity. According to the invention, this is achieved in that the holding ring is formed of elastic material and the hook part is supported so as to be tiltable about a center of rotation at the wiper bearing. When the hook part is inserted into the mounting opening, it swivels radially outward against the holding ring with its end facing opposite from the mounting direction and radially inward with its end facing in the mounting direction.

The blank, e.g., a tubular blank, is supported at the wiper bearing by a contact collar and is supported at the edge of the mounting opening in the mounting direction via an annular damping element on the contact collar. The damping element is installed between the vehicle body and the wiper installation in conformity to standards in order to prevent the transmission of vibrations and noise from the structural component part to the vehicle body. According to an embodiment of the invention, the damping element can be used as a holding ring simultaneously and an additional holding ring can accordingly be omitted so as to save on an additional structural component part. In addition, the annular damping element is mostly formed of elastic material and can therefore take over the elastic function of the catch connection or holding ring.

Depending on the stability of the hook parts and on the equilibrium position of the wiper installation, one or more hook parts are arranged per wiper bearing. However, for a more reliable hold independent from the equilibrium position, it is recommended to provide at least two hook parts per wiper bearing, wherein the two hook parts are advantageously arranged opposite one another.

In order to facilitate the handling and mounting of the hook parts at the wiper bearing, the latter are fastened to the holding ring or the hook parts are formed integral with the holding ring or damping element. This reduces the number of structural component parts and facilitates assembly. In principle, the holding ring can be closed, open or divided into two or more parts and, depending on construction, can be attached to the wiper bearing laterally or from the side facing the mounting opening.

In order to prevent the transmission of structure-borne noise, especially from the wiper drive via the wiper bearings and via the hook parts to the edge of the mounting opening or to the body of the motor vehicle, the hook parts are preferably at a distance from the edge of the mounting opening after assembly is completed.

BRIEF DESCRIPTION OF THE DRAWINGS

Embodiment examples of the invention are shown in the drawing. A number of features are shown and described in context with the description and in the claims. The person skilled in the art will advisably also consider the features individually and combine them in further useful combinations.

DETAILED DESCRIPTION OF THE PREFERRED EMBODIMENTS

Figure 1:
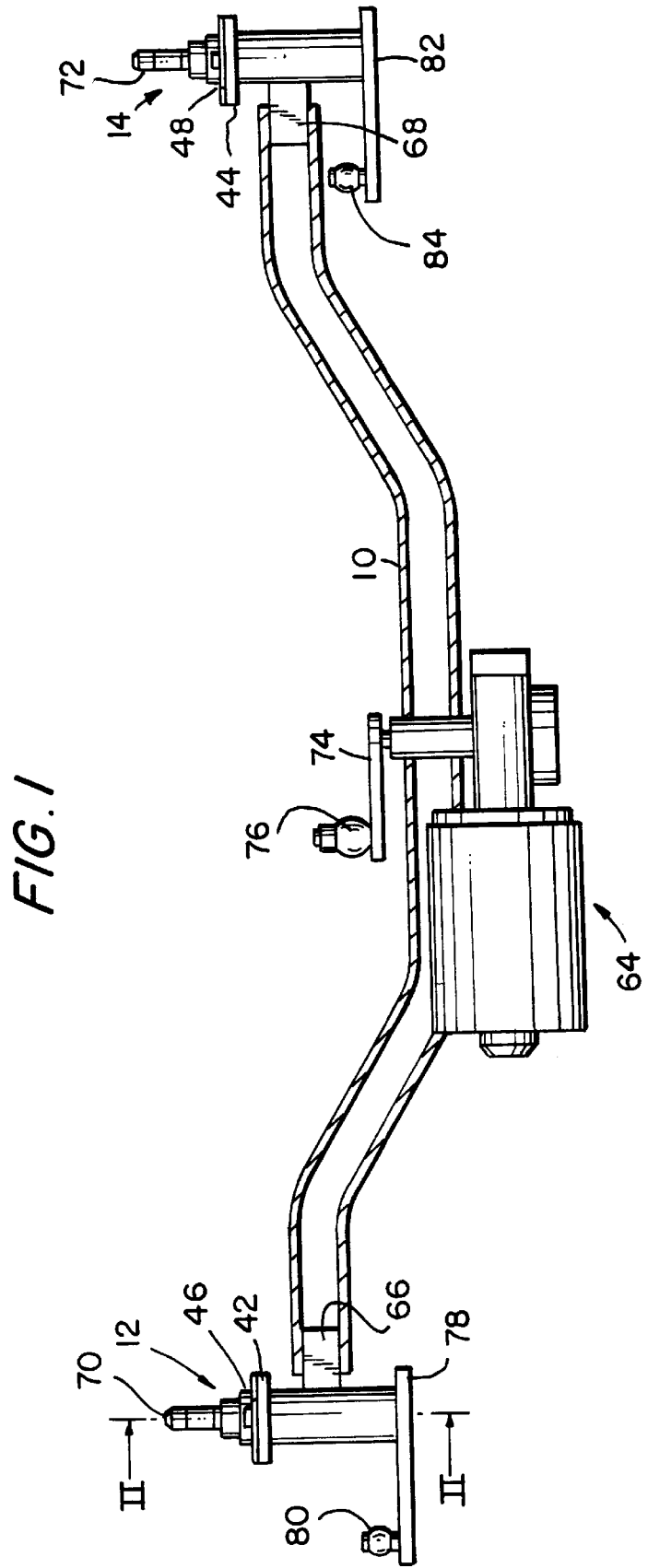
FIG. 1 shows a wiper installation.

FIG. 1 shows a wiper installation with a plate or blank in the form of a tubular blank 10 at which are fastened a wiper drive 64 and two wiper bearings 12, 14. The wiper bearings 12, 14 are pressed into the tubular blank 10 at the sides by cylindrical fastening parts 66, 68 in an interference fit or the tubular blank 10 is crimped in the area of the fastening parts 66, 68. However, other types of fastening for the wiper bearings 12, 14 are also possible. Driven shafts 70, 72 are supported in the wiper bearings 12, 14 and are driven by the wiper drive 64 via a crank 74 and an articulated ball 76 at the wiper drive 64, via a rod linkage, not shown in more detail, and via a crank 78, 82 and an articulated ball 80, 84 at the wiper bearing 12, 14.

Figure 3:
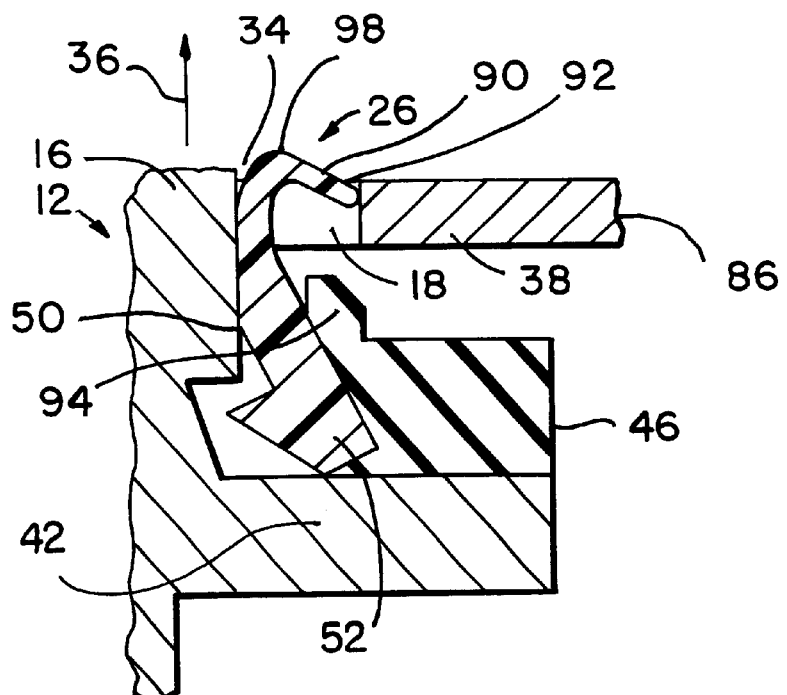
FIG. 3 shows a hook part according to FIG. 2 during assembly.
Figure 5:
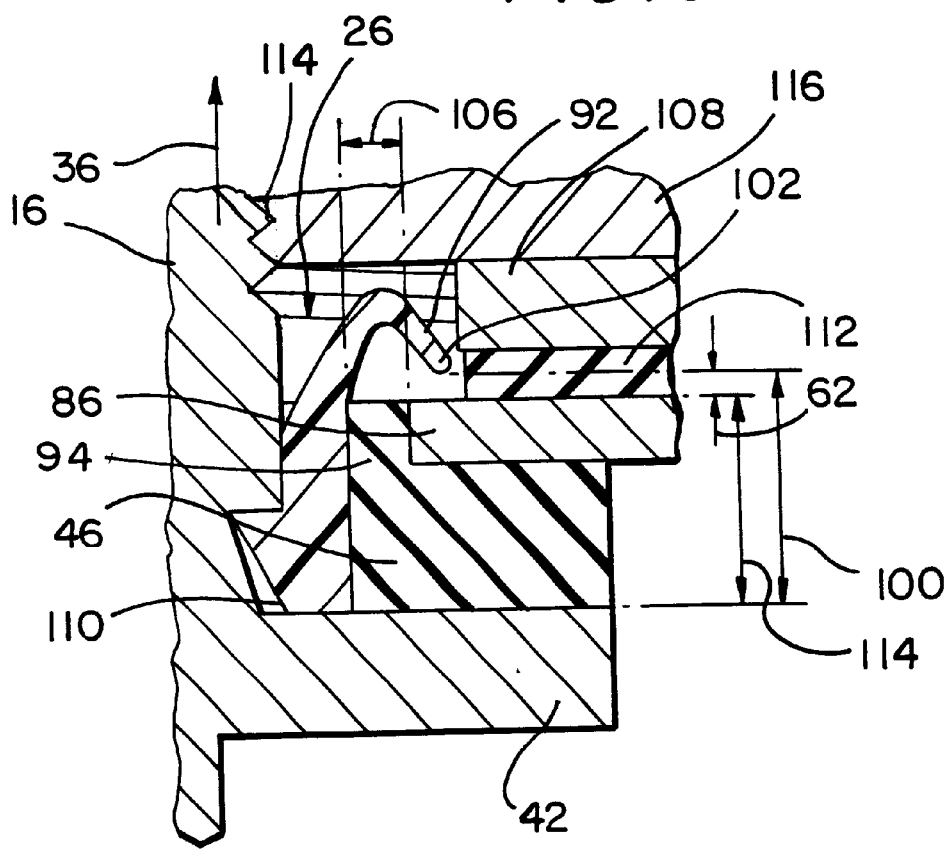
FIG. 5 shows a hook part after the wiper installation has been completely fastened.

During assembly of the wiper installation, the driven shafts 70, 72 and a part 16 of the wiper bearings 12, 14 are pushed through a mounting opening 18 in a mounting plate 86, so that the driven shafts 70, 72 project out of the mounting opening 18 at the vehicle body (FIG. 3). The mounting opening 18 can also be introduced directly in the vehicle body instead of in a mounting plate 86. A thread, not shown in more detail, is located on the part 16 of the wiper bearing 12, 14 that is pushed through, wherein a nut is screwed onto this thread from the side of the driven shafts 70, 72. The wiper bearings 12, 14 are accordingly pulled into the mounting openings 18 until contact collars 42, 44 arranged at the outer circumference 34 of the wiper bearings 12, 14 are supported at the mounting plate 86 in the mounting direction 36 via a damping element 46, 48, so that the wiper installation is fastened (FIGS. 1 and 5). Aside from the contact collars 42, 44, other stop elements known to the person skilled in the art by which the wiper installation can be supported are also possible. Subsequently, wipers are fastened to the driven shafts 70, 72 and are driven by the driven shafts 70, 72 so as to move across a windshield of the motor vehicle.

According to the invention, catch connections 20, 22, 24 are arranged at the wiper bearings 12, 14 above the contact collars 42, 44, wherein these catch connections 20, 22, 24 snap in as soon as the wiper bearings 12,14 are pushed into the mounting openings 18 (FIGS. 2 to 8). The wiper installation is held reliably by the catch connections 20, 22, 24 without having to be held additionally by the person performing assembly. The catch connections 20, 22, 24 are preferably formed by hook parts 26, 28, 30, 32 which are fastened to the circumference of the wiper bearings 12, 14.

Figure 2:
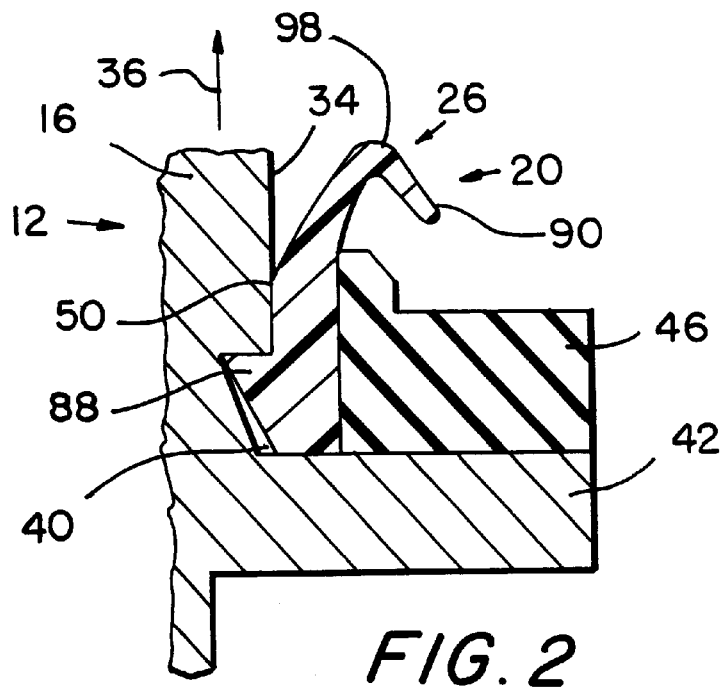
FIG. 2 shows a section of the sectional plane along line II—II in FIG. 1 through a hook part.
Figure 4:
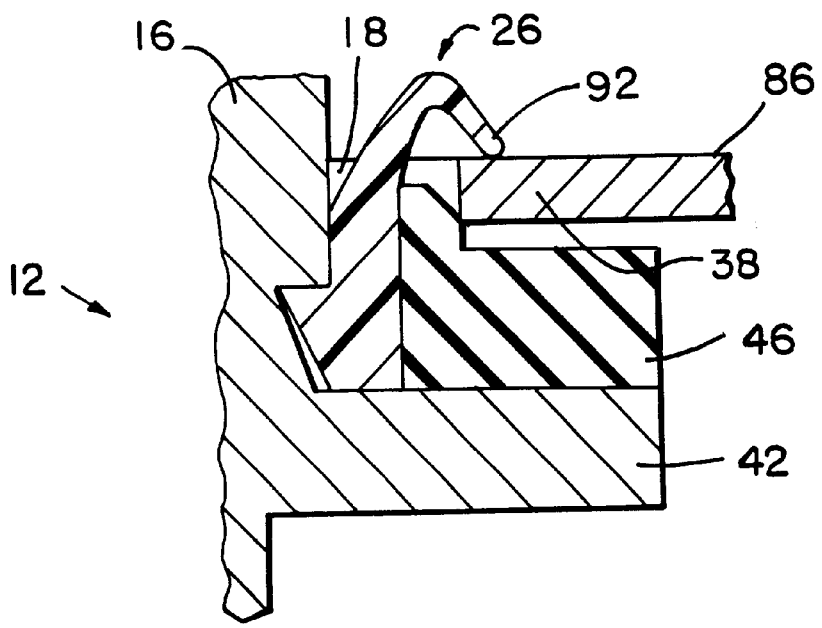
FIG. 4 shows a hook part in the holding state during assembly.

The hook part 26 shown in FIG. 2 is pressed via the damping element 46 with a projection 88 into a recess 40 at the outer circumference 34 of the wiper bearing 12 and is accordingly fastened in a positive engagement at the circumference 34 of the wiper bearing 12. If the wiper bearing 12 is pushed through the mounting opening 18 (FIG. 3), the mounting plate 86 comes into contact with a bevel 90 of the hook part 26 and tilts it with the end 98 facing in the mounting direction 36 about a center of rotation 50 at the circumference 34 of the wiper bearing 12 until the hook 92 of the hook part 26 fits through the mounting opening 18. The end 52 of the hook part 26 facing the contact collar 42 is deflected radially outward against the damping element 46 as a result of the tilting movement of the hook part 26, wherein the damping element 46 is elastically deformed. If the hook 92 is pushed through the mounting opening 18, the hook part 26 is reset in its initial position by the damping element 46 (FIG. 4). The hook 92 catches with a perceptible sound at the edge 38 of the mounting plate 86. The person performing the assembly can perceive that the wiper installation is secured in its position due to the snap-in noise.

Subsequently, the wiper bearing 12 can be screwed into the mounting opening 18 with a nut 116 which is screwed in the direction opposite to the mounting direction 36 on a thread 114 on the wiper bearing 12. In order not to damage the hook part 26, for example, the nut can be supported directly at the mounting plate 86 via a washer 108 with an integrated uncoupling element 112 made of rubber, wherein the hook part 26 fits into the inner circumference of the washer 108 and the washer 108 is thicker than the part of the hook part 26 overlapping the mounting plate 86. It is also possible that the nut is supported at another structural component part.

In order to prevent the transmission of structure-borne noise from the wiper installation via the wiper bearing 12 and via the hook part 26 to the mounting plate 86 and to the body, the distance 100 between the lower edge 102 of the hook 92 and the lower contact surface 110 of the hook part 26 is greater than the combined thickness 104 of the mounting plate 86 and damping element 46. When the wiper bearing 12 is screwed in, it is drawn farther into the mounting opening 18. The hook 92 of the hook part 26 with the lower edge 102 disengages from the mounting plate 86, so that there results an axial distance 62 between the hook part 26 and the mounting plate 86. Further, the damping element 46 has a centering ring 94 which centers the wiper bearing 12 in the mounting opening 18 and ensures a radial distance 106 between the mounting plate 86 and the hook part 26 in addition to the axial distance 62.

Figure 6:
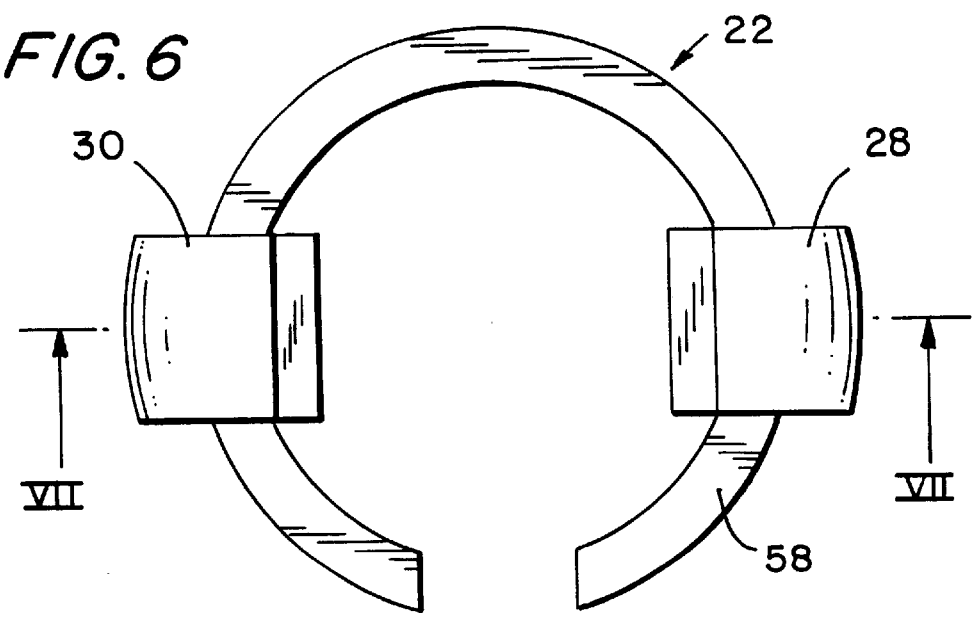
FIG. 6 shows a holding ring with two oppositely located hook parts.
Figure 7:
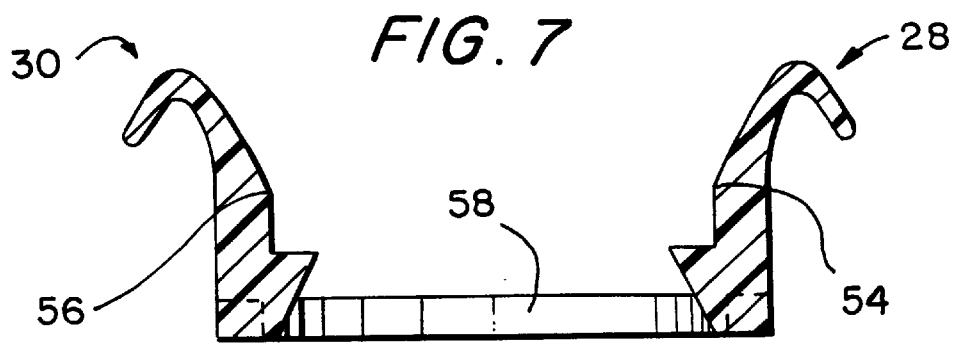
FIG. 7 shows a section along line VII—VII in FIG. 6.

Depending on the load, one or more hook parts can be arranged at the wiper bearings 12, 14 so as to be distributed about the circumference. However, two oppositely located hook parts 28, 30 are preferably provided per wiper bearing 12, 14. In order to facilitate the mounting of the hook parts 28, 30, the latter are fastened to a holding ring 58 in one embodiment of the invention (FIG. 6). The holding ring 58 can serve exclusively to fasten one or more hook parts 28, 30 to the wiper bearing 12, 14 in an advantageous manner. Further, it can be constructed as a spring ring which presses the hook parts 28, 30 into the recess 40 and is deflected elastically during mounting. FIG. 7 shows a section along line VII—VII. During assembly, the hook parts 28, 30 are tilted in turn about centers of rotation 54, 56.

Figure 8:
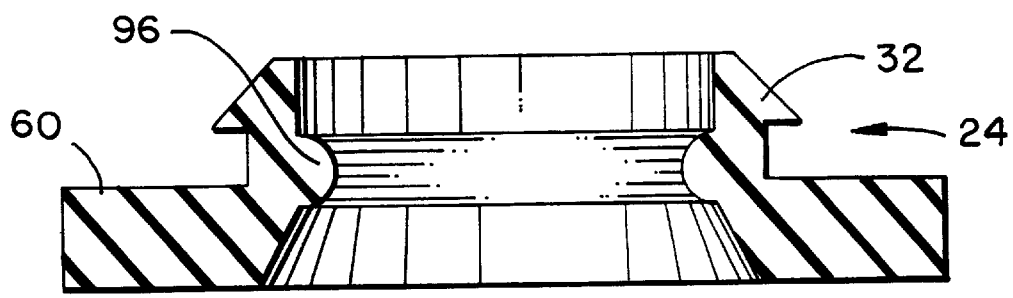
FIG. 8 shows a one-piece damping element and hook part.

In the construction according to the invention shown in FIG. 8, the hook part 32 and the damping element 60 are constructed in one piece. The hook part 32 forms a holding ring which is closed along the circumference; a plurality of hook parts distributed along the circumference are also possible. The hook part 32 and the damping element 60 are fastened jointly via a bead 96 in a recess at the wiper bearing in a positive engagement. The hook part 32 is deflected in an elastic manner during assembly.

What is claimed is:

1. Wiper installation comprising a wiper bearing (12, 14) which is guided and fastened in a preassembled state to form a part (16) through a mounting opening (18) of a motor vehicle, the wiper bearing (12, 14) being held in the mounting opening (18) via a catch connection (20, 22, 24) during fastening, said catch connection (20, 22, 24) including at least one hook part (26, 28, 30, 32) which is fastened to the outer circumference (34) of the wiper bearing (12, 14) and can be locked in at an edge (38) of the mounting opening (18) in the mounting direction (36), wherein said at least one hook part (26, 28, 30, 32) is held in a recess (40) at the circumference (34) of the wiper bearing (12, 14) via a holding ring (48, 58, 60), and wherein said holding ring (46, 48, 58) is made from elastic material and said hook part (26, 28, 30) is tiltable about a center of rotation (50, 54, 56) at the wiper bearing (12, 14) and, in so doing, is swivelable radially outward with an end (52) thereof facing in the direction opposite to the mounting direction and is swivelable radially inward with an end (98) thereof facing in the mounting direction (36).

2. Wiper installation according to claim 1, wherein two oppositely located hook parts (28, 30) are arranged at the wiper bearing (12, 14).

3. Wiper installation according to claim 1, wherein the hook part (28, 30, 32) and the holding ring (46, 48, 58, 60) are fixedly connected.

4. Wiper installation according to claim 1, wherein the hook part (26, 28, 30, 32) in the assembled state is at a distance (62, 106) from the edge (38) of the mounting opening (18).

5. Wiper installation comprising a wiper bearing (12, 14) which is guided and fastened in a preassembled state to form a part (16) through a mounting opening (18) of a motor vehicle, the wiper bearing (12, 14) being held in the mounting opening (18) via a catch connection (20, 22, 24) during fastening, said catch connection (20, 22, 24) including at least one hook part (26, 28, 30, 32) which is fastened to the outer circumference (34) of the wiper bearing (12, 14) and can be locked in at an edge (38) of the mounting opening (18) in the mounting direction (36), and wherein said at least one hook part (26, 28, 30, 32) is held in a recess (40) at the circumference (34) of the wiper bearing (12, 14) via a holding ring (48, 58, 60), said holding ring (46, 48, 60) being a damping element which is arranged at a contact collar (42, 44) and the wiper bearing (12, 14) is supported at the edge (38) of the mounting opening (18) in the mounting direction (36) in the mounted state via the damping element.

6. Wiper installation according to claim 5, wherein the hook part (32) and the damping element (60) are constructed in one piece.

7. Wiper installation comprising a wiper bearing (12, 14) which is guided and fastened in a preassembled state to form a part (16) through a mounting opening (18) of a motor vehicle, the wiper bearing (12, 14) being held in the mounting opening (18) via a catch connection (20, 22, 24) during fastening, said catch connection (20, 22, 24) including at least one hook part (26, 28, 30, 32) which is fastened to the outer circumference (34) of the wiper bearing (12, 14) and can be locked in at an edge (38) of the mounting opening (18) in the mounting direction (36), wherein said at least one hook part (26, 28, 30, 32) is held in a recess (40) at the circumference (34) of the wiper bearing (12, 14) via a holding ring (48, 58, 60), and wherein said holding ring (46, 48, 58) is made from elastic material and said hook part (26, 28, 30) is tiltable about a center of rotation (50, 54, 56) at the wiper bearing (12, 14) and, in so doing, is swivelable radially outward with an end (52) thereof facing in the direction opposite to the mounting direction and is swivelable radially inward with an end (98) thereof facing in the mounting direction (36), said holding ring (46, 48, 60) being a damping element which is arranged at a contact collar (42, 44) and the wiper bearing (12, 14) is supported at the edge (38) of the mounting opening (18) in the mounting direction (36) in the mounted state via the damping element.

* * * * *